United States Patent [19]

Tittel

[11] Patent Number: 4,940,175
[45] Date of Patent: Jul. 10, 1990

[54] CAR-TOP CARRIER

[76] Inventor: Eberhard Tittel, Lagerstrasse 1, D-7981 Grunkraut-Gullen, Fed. Rep. of Germany

[21] Appl. No.: 331,493

[22] Filed: Mar. 31, 1989

[51] Int. Cl.$^5$ .............................................. B60R 9/04
[52] U.S. Cl. .................................... 224/324; 224/282; 224/309; 224/315; 224/316; 224/321; 224/917
[58] Field of Search ............... 224/282, 309, 315, 316, 224/321–324, 329, 917, 314, 42.08, 42.45 R, 42.07, 30 R; 16/319, 348, 357, 360, 361, 386, 374, 377

[56] References Cited

U.S. PATENT DOCUMENTS

| 2,347,981 | 5/1944 | Apfelbaum | 16/374 |
| 2,498,557 | 2/1950 | Lantz | 16/374 |
| 2,498,558 | 2/1950 | Lantz | 16/374 |
| 2,650,871 | 9/1953 | Holderegger | 16/374 |
| 3,622,057 | 11/1981 | Marker | 224/917 |
| 4,823,996 | 4/1989 | Mosher | 224/322 |

FOREIGN PATENT DOCUMENTS

| 1146403 | 3/1963 | Fed. Rep. of Germany | 16/360 |
| 0015040 | 1/1982 | Japan | 224/309 |

Primary Examiner—Henry J. Recla
Assistant Examiner—Keith Kupferschmid
Attorney, Agent, or Firm—Marshall, O'Toole, Gerstein, Murray & Bicknell

[57] ABSTRACT

A car-top carrier (1) with supporting elements (3) which can be connected to the top of a car and at least one supporting member (2) connected to the car top by the supporting elements, on which at least one holding member (6) for the objects to be transported is disposed, is designed in such a way that the influences of wind-resistance can be diminished in case no object is transported in the car-top carrier. A joint (8) is disposed between the supporting member (2) and the holding member (6), with a swiveling axis (10) of the joint extending transversely to the direction of travel (7), and the holding member (6) can be swiveled between a use position and nonuse position about the axis (10).

8 Claims, 3 Drawing Sheets

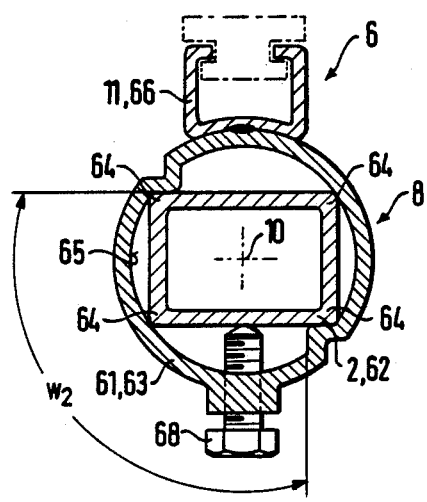
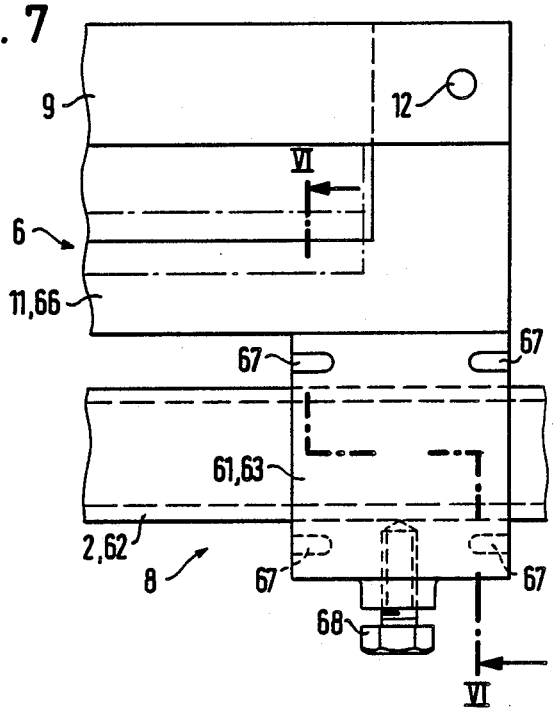
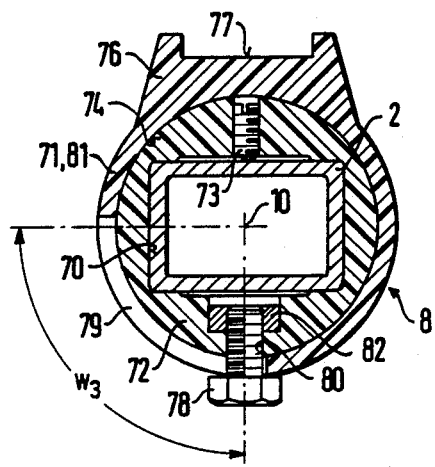
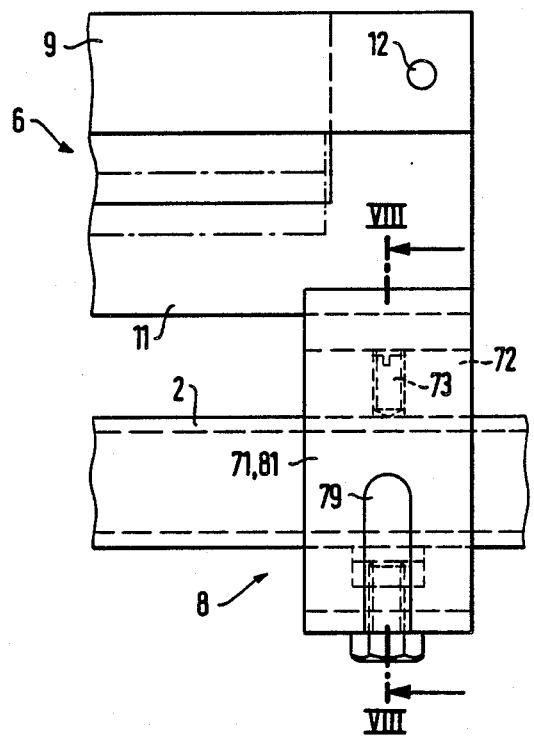

CAR-TOP CARRIER

BACKGROUND OF THE INVENTION

1. Field of the Invention

The invention relates to a car-top carrier. 2. Description of Related Technology Prior car-top carriers have differing constructions depending on the different objects to be transported, such as bicycles, skis, surfboards, and the like. Constructions also differ depending on the required position in which the objects are to be transported, with respect to the carrier and with respect to the vehicle (such as on the roof of a passenger car, and on the side or on the roof of a camper). In all cases, at least one supporting member and one holding member are provided with which the object to be transported is held and carried on the carrier.

Due to its function, the holding member is necessarily spaced from the supporting member, usually transversely to the direction of travel of the vehicle. In this position, there is a considerable wind resistance during travel when the holding member has a large frontal surface in the direction of travel. This is especially the case for ski holders, in which at least one ski can be clamped between two clamping strips.

The utilization of a car-top carrier is seasonal in most cases. During the season (for example, summertime for the transportation of bicycles and surfboards; wintertime for the transportation of skis), the car-top carrier is preferably left attached to the vehicle in order to save the labor of dismantling. Then, the objects to be transported are attached to the roof-top carrier on the day that they are going to be used, such as on a weekend. At other times, the holding member contributes to a significant increase of the wind-resistance during travel and to the production of noise, which have an adverse influence not only on comfort, but also on the useful performance of the vehicle.

SUMMARY OF THE INVENTION

It is an object of the invention to overcome one or more of the problems described above.

According to the invention, a car-top carrier is provided wherein the influence of wind-resistance can be reduced when no object is transported in the carrier.

According to the invention, a joint is provided between the supporting and holding members of the carrier, which makes it possible to swivel the holding member from a use position (which is, for example, vertical to the direction of travel and spaced from the supporting member) into a nonuse (e.g. horizontal) position, where the holding member presents a smaller surface to the direction of travel or is in a position which is favorable for air flow in front of or, preferably, to the leeward side of the supporting member. The holding member can be swiveled quickly and simply into the use position. Therefore, in the nonuse position, the surface area exposed to the wind during travel is reduced considerably, as a result of which the power of the vehicle can be utilized better and travel comfort is improved. Also, the wind noise produced by the carrier during travel is significantly reduced.

In some embodiments, the carrier can be secured in the use and/or nonuse position with the aid of a locking member and a locking screw. Fundamentally, such fixing is not necessary either in the use position or in the nonuse position, because, in the nonuse position, the holding member remains in position due to its own weight. In this position, it can be allowed to rest on a soft cushion so that even flapping noises are avoided. In the use position, such fixing is not necessary because, due to the arrangement of two car-top carrier units, one behind the other, the holding of an object to be transported secures the holding member in its use position. However, when one is able to secure the holding member in the use position, the securing of the object to be transported in the holding member is simplified.

Swiveling into the nonuse position or to the leeward side of the supporting member can be achieved especially simply when the supporting member is a transverse rod of the carrier, which can extend both horizontally and vertically (e.g. a side carrier in the case of a camper).

In another embodiment, the construction is compact and swiveling of the holding member into the leeward side of the transverse rod in case of nonuse is made expedient.

Other embodiments make it possible to design simple, compact, and expedient embodiments, which can be produced easily and inexpensively and also permit ready handling by the user when swiveling the holding member between the use and nonuse positions.

Other embodiments provide one piece construction of at least one joint, which may be desirable from the point of view of theft protection, while other designs make it possible to secure the holding member in the use position by locking the holding member or an added portion of it in a locking recess.

For fixing the holding member in the nonuse position, it is advantageous to provide a locking member which permits fixation of the holding member in the nonuse position under the action of a spring force or under its own weight.

Other objects and advantages of the invention will be apparent to those skilled in the art from a review of the following detailed description, taken in conjunction with the drawings and the appended claims.

BRIEF DESCRIPTION OF THE DRAWINGS

The invention will be explained with the aid of preferred embodiments represented in simplified drawings. The following are shown:

FIG. 6 shows a joint in the vertical cross-section VI—VI of FIG. 7 as another embodiment;

FIG. 7 shows the joint according to FIG. 6 in a front view;

FIG. 8 shows a joint in the vertical cross-section VIII—VIII in FIG. 9 as an example of another embodiment; and FIG. 9 shows the joint of FIG. 8 in a front view.

DETAILED DESCRIPTION OF THE INVENTION

Figure 1:
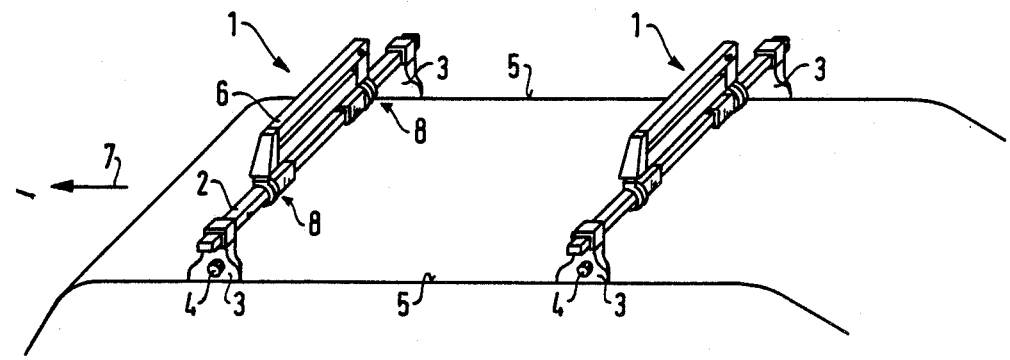
FIG. 1 is a perspective view of a car-top carrier of the invention, comprising two identical carrier units attached to the roof of a car.
Figure 2:
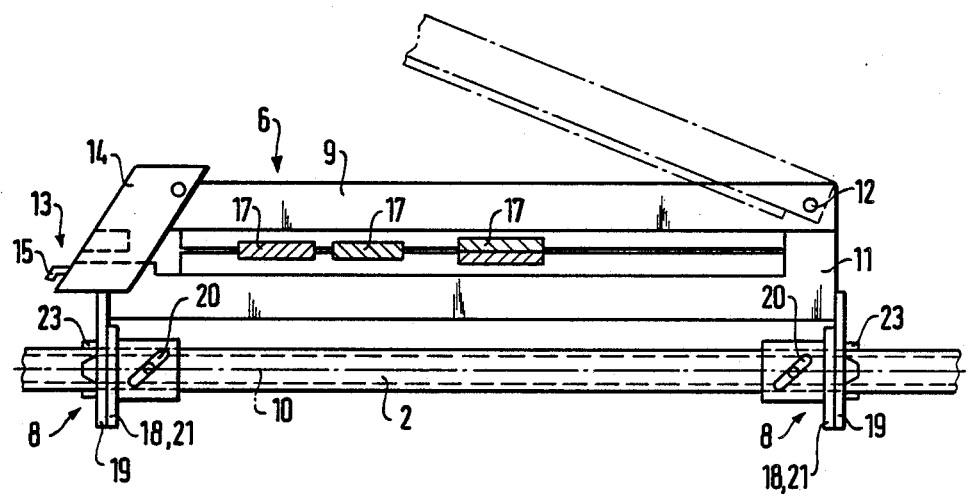
FIG. 2 is an enlarged vertical elevation of supporting and holding members of a carrier unit of FIG. 1.

A car-top carrier unit, generally designated 1 in FIG. 1, includes a supporting member 2 in the form of a transverse member comprising a tube having a rectangular (e.g. square) cross-section, and, attached at the ends of the supporting member 2, supporting posts 3, which can be secured with the aid of locking screws 4 on mounting members as, for example, on a rail of a car roof-top 5 (shown schematically), and a holding member 6 for long objects to be transported, such as skis. In FIGS. 1 and 2, the holding member 6 is in its use position, in which it stands upward, away from the supporting member 2, transversely to the direction of travel 7 of the car.

A joint, generally designated 8, is provided between the holding member 6 and the supporting member 2. The joint 8 makes it possible to swivel the holding member 6 as desired between a substantially vertical use position and into a horizontal nonuse position, which is angularly disposed from the former by 90°. In the nonuse position the holding member 6 is substantially in the leeward side of the supporting member 2. The axis of the joint 8 is designated 10.

The holding member 6 includes two locking strips 9 and 11 arranged on top of one another in the use position. The strips 9 and 11 are connected together by a joint 12 at their ends so that they can be swiveled, while they can be locked on the other end as, for example, by a lock 13. The lock 13 is at a respective end of a head piece 14 arranged on the upper locking strip 9, which is connected with the respective end of the lower locking strip 11 with a lock 15 which is indicated in the Figures and which is secured by the lock 13 in this position. The locking strips 9,11, include a protective coating made of a resilient material, such as rubber, on the sides adjacent to the transported object(s), between which a ski 17 can be clamped, as shown in FIG. 2.

Figure 4:
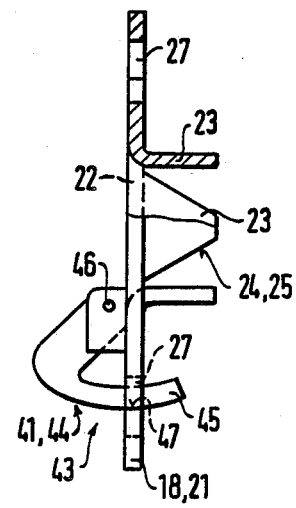
FIG. 4 shows the portion of the joint on the supporting member side as a side view from the left of FIG. 3 and in partial cross-section.

The joint 8, which comprises two spaced joint sections includes a joint member 18 engaging the supporting member and joint member 19 engaging the holding member. Preferably, the joint member 18 is designed as a disc 21, and the joint member 19 is U-shaped. At the center of the disc 21, there is a hole 22, of a size corresponding to the outside cross-section of the transverse supporting member 2, with which the disc 21 is placed on the transverse supporting member with little play. As a result, attachment of the holding member 6 on the supporting member 2 is facilitated. In order to increase the supporting area on the supporting member 2, supporting angles 23 extend from the edge of the hole 22 parallel to the axis 10 thereof. The angles 23 are designed in the form of a bushing, that is, they are connected to one another in the peripheral direction (FIG. 2), or they can be separated at the corners, as shown in FIG. 4.

Axial slipping on the supporting member 2 can be prevented by preloading the supporting angles 23 against the outside surfaces of the supporting member 2. However, other securing elements can also be provided, for example, a locking screw 20, as shown in FIG. 2, for axial securing, which acts against the supporting member 2 and is arranged in at least one of the supporting angles 23, for example, on a welded-on nut. Preferably, the supporting angles 23 are bent out from the region of the hole 22 whereby separating cuts and miter cuts 24,25 (FIG. 4) are made beforehand in the region of the hole 22 on the disc 21. Preferably, one or both of the joint members 18 and 19 especially member 18 (on the supporting member side) can be formed from a stamped piece, preferably of sheet metal, or alternatively the joint members 18,19 may be formed of plastic.

Figure 3:
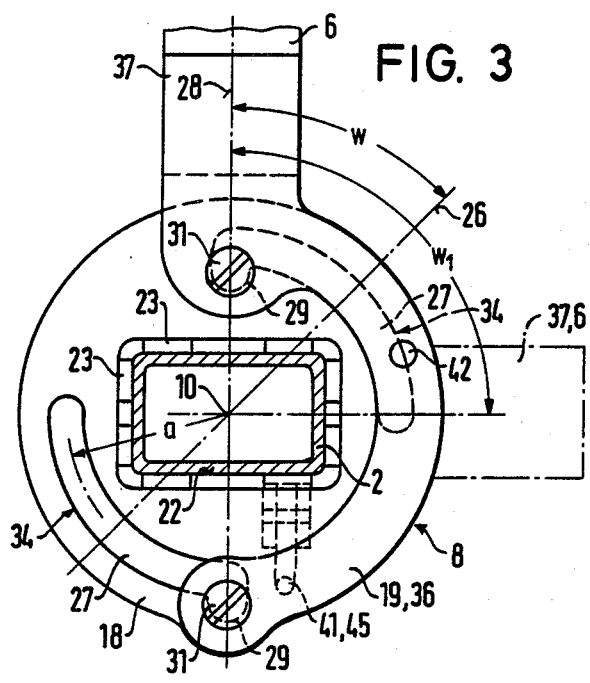
FIG. 3 is a cross-sectional view of the holding and supporting members of FIG. 2 with a joint disposed between them, shown in a side view from the right of FIG. 2.

In the disc 21, there are two diametrically opposed circular arc-shaped slits 27, arranged symmetrically with respect to an imaginary diagonal line 26, which, in the use position of the carrier unit 1 forms a 45° angle W and the slits extend over an angle $W_1$ of about 90°. As a result of this, the left end of the right slit 27 is disposed above the right end of the left slit 27 in FIG. 3, namely in the perpendicular bisector 28 of the joint 8. Locking depressions 29 extend downwardly from each slit 27 in the region of the perpendicular bisector 28. The joint members 18,19 are held together with two diametrically opposed bolts 31, at an arc distance a corresponding to the distance of each slit 27 from the axis of the joint 10, and hold together the joint member 19 on the holding member side in the holes 32 (FIG. 5) and the joint member 18 on the supporting member side in the slits 27, and can grip behind the joint members 18,19 with bolt heads on both sides.

Based on this arrangement, the bolts 31 not only hold the joint members 18,19 together, but also provide a guide, generally designated 34, which permits one to swivel the joint member 19 around the joint member 18 at an angle of $W_1$, whereby the final position after swiveling is limited by the ends of the slits 27. In the use position of the holding member 6, the bolts 31 lock into the locking depressions 29, whereby the holding member 6 is shifted slightly downwardly with respect to the supporting member 2. In this locked position, the holding member 6 is blocked against turning with respect to the supporting member 2.

Fundamentally, it is possible to use a different number of slits and slits of different shape when horizontal swing and guiding is provided.

It is possible to use the bolts 31 in the form of locking screws which can be screwed through or into one of the joint members 18,19, as a result of which, by tightening the locking screws, the holding member 6 can be secured in either of the use or nonuse positions, by clamping.

The joint member 19 on the holding member side is also designed as a disc, and is U-shaped as a strap 36 with a connecting end 37, with which it is secured on the holding member 6. The joint member 19 can also be a stamped piece. The connecting end 37 can be a one-piece straight section starting from a strap bent into the shape of a circular arc, or it can be angled, when the free end of such an angle can serve as support for the holding member 6.

In order to attach the joint member 19 on the holding member side, in the nonuse position, a locking device can be provided on one of the joint members 18,19, and to which a spring force or its own weight is applied when in the locked position in a locking recess in the other joint member. In FIG. 4, a locking bar 41 of a locking device, generally designated 43, is formed by a hook-shaped swiveling member 44, and a locking section 45 is curved into a circular arc about a corresponding swiveling axis 46. The arrangement is made in such a way that the locking section 45 swivels into a locking recess 47 and locking recess 42 which is located in joint member 19 due to its own weight, when the joint member 19 on the holding part side reaches the nonuse position. The recess 47, which is located in the joint section 18, on which the locking bar 41 is arranged, can serve as a guide recess. Therefore, the locking bar 41, which locks in with its own weight in the manner described above, is advantageously arranged on the joint member 18 on the supporting member side, because this always remains in its position, and therefore the preload produced by its own weight is always present. If such a locking bar would be arranged on the joint member 19 on the holding member side, this would not be the case.

Figure 5:
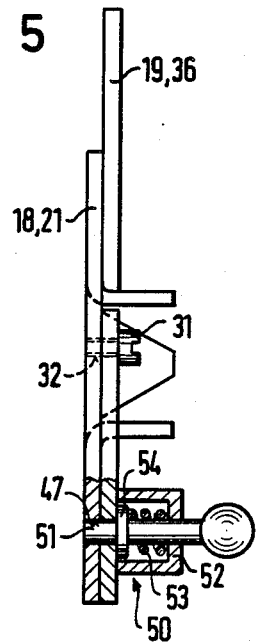
FIG. 5 shows an alternative form of the joint of FIG. 4, in cross-section.

In the embodiment of FIG. 5, a locking device generally designated 50 with an axially displaceable locking bar 51 in the form of a catching element on the joint member 19 on the holding member side is guided in a sleeve 52 and is pressed in its locked position with the aid of a stressed spring 53, which acts against a shoulder 54.

Thus, both locking bars 41 and 51 fall automatically into the locked position. Before swiveling of the holding member 6 or the joint member 19 into the use position, the locking bars 41, 51 must be removed manually for a short time from their locked positions.

Within the framework of the invention, it is also possible to assign a corresponding preloading spring to the locking bar 41. Moreover, it is possible to provide the joint with a joint bolt in the known manner, the bolt defining the swiveling axis of the joint. Furthermore, it is possible to place the joint 8 not coaxially to the supporting member 2 as described above, but preferably displaced horizontally with respect to the supporting member 2. However, in such a design, it is more difficult to arrange the holding member in such a way that it is in the leeward side of the supporting member in its nonuse position.

All embodiments of the invention are suitable for removable car-top carriers or units, as well as for stationarily secured ones such as, for example, a rail. In this case, the car-top carrier can be secured to the roof of the car as well as to the side or to structural parts connected to the roof of the vehicle, for example, as is frequently done in the case of campers.

In the embodiment of FIGS. 6 and 7, joint members 61, 62 of the joint 8 are arranged coaxially within one another, that is, the outer joint member 61 is placed on the inner joint member 62, which is formed by the supporting member 2 itself, that is, by the hollow supporting rod of the car-top carrier, the supporting member 2 comprising a rod having a rectangular cross-section. As in the embodiments described above, the broad side of the supporting member 2 is disposed horizontally. The inner cross-section of the outer joint member 61, which is formed by a round tubular element 63, with substantially the same wall thickness, is dimensioned so that longitudinal edges or corners 64 of the supporting member 2 are surrounded by an inner wall 65 of the tubular element 63, with little play. The swiveling motion of the holding member 6, the lower locking strip 11 of which is formed by a U-shaped profile track 66, into which a correspondingly shaped profiled protecting strip is placed to provide the protective coating described above (and shown in phantom line in FIG. 6), is limited by diametrically opposed stops on the inner wall 65, formed by at least one, and preferably two radial indentations 67 or beads. The arrangement is designed in such a way that, due to the difference in the length and width of the supporting member 2, the swiveling motion is limited to an angle $W_2$ of 90°.

The hubs between the tubular element 63 and the profile track 66 are adapted. In the present embodiment, the hub of the profile track 66 is adapted to the round shape of the tubular piece, whereby the connection can be made by welding, especially by spot-welding (FIG. 6).

Securing of the holding member 6 or of the outer joint member 61 in the use or nonuse position is effected with the aid of a set screw 68 having a head, which is screwed in the present embodiment in the use position from underneath and from outside into the tubular element 63, with its tip abutting the lower broad side of the supporting member 2.

In this embodiment, the outer and inner joint members 61 and 62 are made of metal or plastic, whereby the supporting member 2, as in the previously described embodiments, may consist of a metal tube which can be coated with a plastic, if desired.

As shown in FIG. 7, the indentations 67 are parallel to the axis of the joint 8, extend to the end of the tubular element 63, and have a length of about 5 mm. As a result, weakening of the tubular element 63 by the indentations is avoided. The length of the tubular element 63 is about 30 mm.

In the embodiment of FIGS. 8 and 9, respective outer and inner joint members 71 and 72 are disposed axially about each other. However, the inner joint member 72 has a circular vertical cross-section and is secured axially with a preferably centrally located, adapted recess 70 on the tubular supporting member 2 and with a radial sunken set screw 73 which can be screwed into the joint member 72. The outer joint member 71 has a round bearing bore 74 which accommodates the outer surface of the inner joint member 72. The outer bearing member 71 is thus formed as a tube and, on the upper side, has a thickened portion 76 in the form of a head with a groove 77 on which or in which the lower locking strip 11 is secured in a manner not shown here.

A set screw 78 with a head is used to limit the swiveling motion in the peripheral direction, as well as for axial securing. The set screw 78 extends radially in a long hole 79 which extends about the periphery of a wall 81 of the outer joint member 71, and engages in the inner joint member 72 in a preferably radial threaded hole 80. The hole 79 is dimensioned such that a swiveling angle $W_3$ of about 90° results. In this embodiment, both the outer as well as the inner joint members 71, 72 are preferably made of plastic. In order to increase the strength, a nut 82 is injected into inner joint member 72, into which the set screw 78 engages. The design described above makes it possible to clamp securely the holding member 6, not only in the use or nonuse position, but also in intermediate positions within the swiveling angle $W_3$.

In all embodiments, it is possible to make the arrangements (e.g., by mounting), in such a way that the holding member 6 can be disposed in the nonuse position behind (i.e. in the leeward side) or in front of the supporting member 2, when viewed in the direction of travel. The advantages that can be achieved by the invention are attained in both cases.

The foregoing detailed description is given for clearness of understanding only, and no unnecessary limitations are to be understood therefrom, as modifications within the scope of the invention will be apparent to those skilled in the art.

I claim:
1. A car-top carrier comprising:
supporting elements that can be attached to a vehicle;

at least one supporting member attached to said supporting elements;

at least one holding member disposed on said supporting member for holding objects to be transported; and a joint disposed between said supporting member and said holding member, a swiveling axis of said joint extending transversely to the direction of travel of said vehicle;

said holding member being rotatable about said swiveling axis between a use position and a nonuse position;

said joint comprising at least one joint member, said joint member being formed in the shape of a disc and comprising at least one circular-arc-shaped curved guide slit around said swiveling axis of said joint; and said joint comprising another joint member comprising at least one guide slide displacable in said slit.

2. The car-top carrier of claim 1, wherein one or two guide slides is disposed in at least one region of said joint in said use position and said guide slide can be locked in a locking recess.

3. The car-top carrier of claim 1, wherein two diametrically opposed guide slits and guide slides which can be moved in said slits are provided.

4. The cartop carrier of claim 3, wherein said guide slide is part of a locking screw.

5. The car-top carrier of claim 3, wherein locking recesses extend from said guide slits.

6. The car-top carrier of claim 1, wherein said guide slide is formed by a bolt.

7. The car-top carrier of claim 6, wherein said bolt grips said joint members with a bolt head formed on said bolt.

8. A car-top carrier comprising:

supporting elements that can be attached to a vehicle;

at least one supporting member attached to said supporting elements;

at least one holding member disposed on said supporting member for holding objects to be transported;

a joint comprised of connected joint members and disposed between said supporting member and said holding member, a swiveling axis of said joint extending transversely top the direction of travel of said vehicle, said holding member being rotatable about said axis between a use position and a nonuse position; and a locking member disposed on one of said joint members to grip another joint member in a recess in one of said positions of said holding member.

* * * * *